Oct. 22, 1957     O. D. IVINS ET AL     2,810,688
PROCESS FOR PREPARATION OF POLY(PERCHLOROMETHYL)BENZENES
Filed Aug. 20, 1954
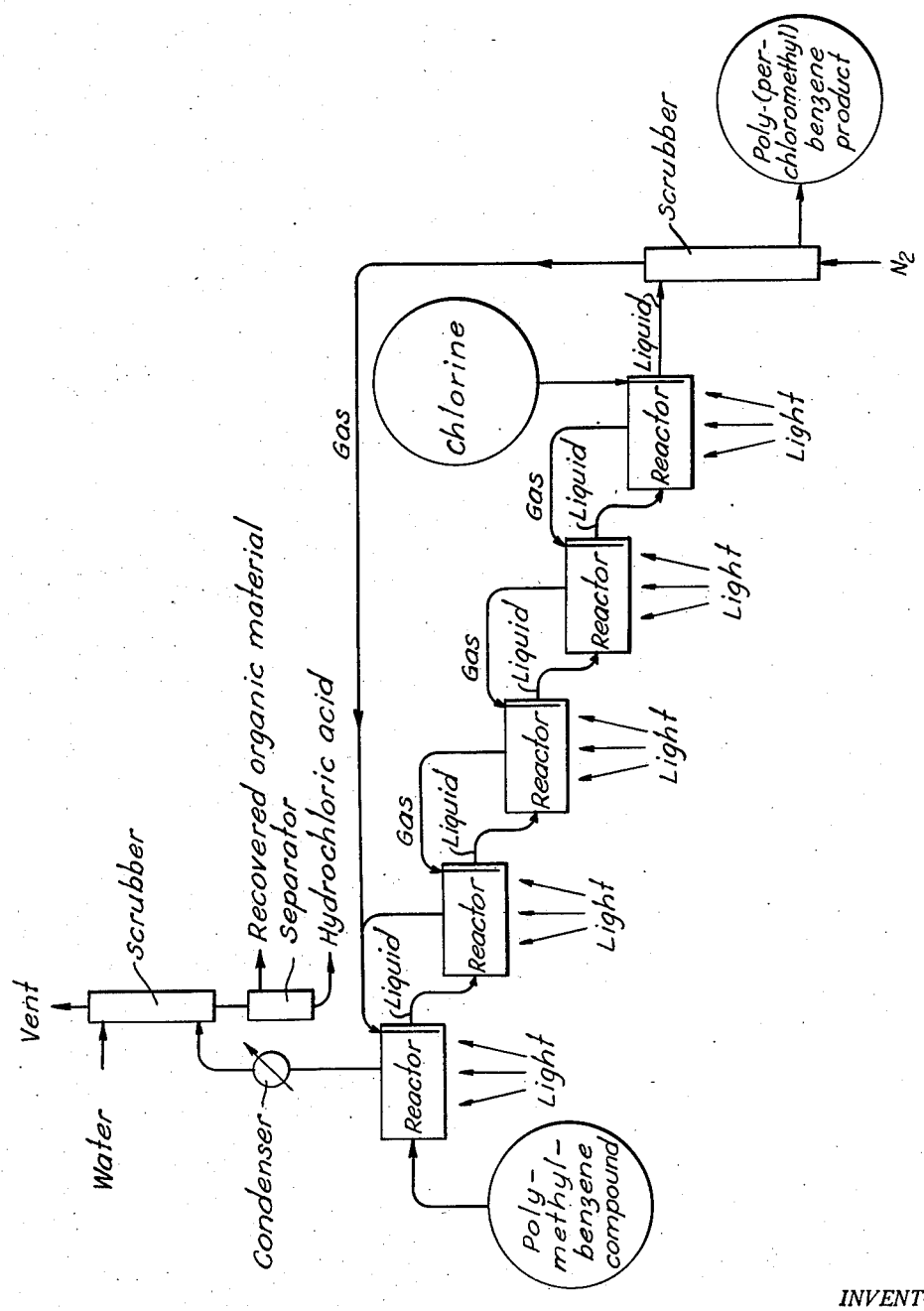
INVENTORS
Owen D. Ivins
James D. Head
Edgar C. Britton
BY Griswold & Burdick
ATTORNEYS

United States Patent Office 2,810,688
Patented Oct. 22, 1957

2,810,688

PROCESS FOR PREPARATION OF POLY(PER-CHLOROMETHYL)BENZENES

Owen D. Ivins, James D. Head, and Edgar C. Britton, Midland, Mich., assignors to The Dow Chemical Company, Midland, Mich., a corporation of Delaware Application August 20, 1954, Serial No. 451,122

8 Claims. (Cl. 204—163)

This invention relates to the preparation of poly-(perchloromethyl)benzene compounds by perchlorination of the side chains of aromatic compounds of the benzene series wherein from two to three carbon atoms of the aromatic nucleus are attached to radicals of the group consisting of methyl and chloromethyl radicals and the remaining carbon atoms of the aromatic nucleus are attached to atoms of the group consisting of hydrogen and chlorine. It pertains particularly to a continuous process for chlorinating xylene, mesitylene, pseudocumene, nuclear chlorinated derivatives thereof and derivatives of such compounds already partially chlorinated in one or more of the side chains, whereby high yields of products having the maximum number of side chain chlorine atoms are obtainable from a nearly theoretical proportion of chlorine.

For simplicity, the term "polymethylbenzene compound" will herein be considered generic to aromatic hydrocarbons of the benzene series having from two to three methyl groups attached to the benzene nucleus, nuclear chloro derivatives of such hydrocarbons, and derivatives of such compounds wherein a hydrogen atom has been replaced by a chlorine atom in one or more of the methyl groups.

Wherever reference is made herein to a chlorinated polymethylbenzene compound, without indication of the position of the chloro-substituents in the molecule, it will be understood that the side-chain derivative is intended, e. g., by "pentachloro-o-xylene" is meant α,α,α,α',α'-pentachloro-o-xylene. Substitution in a benzene nucleus will be clearly indicated, e. g. by names such as 4-chloro-o-xylene and 2-chloro-p-xylene.

The terms "perchlorination" and "perchloromethyl-" are intended to mean the process, and product, of introducing, by direct reaction with chlorine, into the carbon side chains of polymethylbenzene compounds, the maximum number of chlorine atoms capable of being introduced into such positions by that process.

The theoretical perchlorination of a polymethylbenzene compound can be represented by the equation:

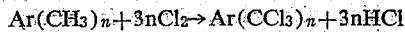

where the symbol Ar represents a benzene nucleus or nuclear chloro-substituted benzene nucleus and $n$ is an integer from two to three.

However, it is not always possible to replace all of the hydrogen atoms on every side-chain by chlorine. For example, when two of the carbon side chains occupy adjacent positions on the benzene nucleus, as in o-xylene, it is known that a maximum of five chlorine atoms can be introduced into the two adjacent groups by direct chlorination, as represented by the equation:

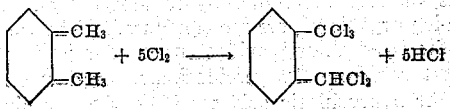

Similarly, with polymethylbenzene compounds in which are more than two nuclear chloro substituents, it is difficult to replace all of the side-chain hydrogen with chlorine.

Hitherto known processes for the preparation of poly(perchloromethyl)benzene compounds from polymethylbenzene compounds by reaction with chlorine require the use of a large excess of chlorine in order to drive the chlorination to the highest level and to sweep the hydrogen chloride out of the reaction mixture. Unless steps are taken to recover the excess of chlorine from the hydrogen chloride vent gas, these processes are wasteful of chlorine and unduly expensive. The recovery of chlorine from admixture with hydrogen chloride is troublesome, being usually carried out by scrubbing the hydrogen chloride out with water and drying the scrubbed chlorine with concentrated sulfuric acid before reusing it. Besides using a wasteful proportion of chlorine, these known processes do not always yield satisfactory products, probably because the chlorination conditions most suitable for completing the chlorination, i. e. for introducing the last of the maximum number of chlorine atoms, are not the most suitable conditions for initiating the chlorination of the starting material, the converse being true also. These hitherto known processes often yield products which contain an undesirable proportion of unwanted by-products and tarry materials.

An object of this invention is to provide a process whereby poly(perchloromethyl)benzene compounds can be economically prepared from polymethylbenzene compounds by direct chlorination with a nearly theoretical proportion of chlorine.

A further object is to provide such a process whereby high yields of poly(perchloromethyl)benzene compounds can be obtained while avoiding the concurrent formation of excessive proportions of by-products and tarry materials.

A further object is to provide such a process which can be carried out continuously and on a commercial scale.

A particular object is to provide such a method for the preparation of pentachloro-o-xylene, hexachloro-m-xylene, and hexachloro-p-xylene from o-xylene, m-xylene, p-xylene, and their partial side-chain-chlorinated derivatives, respectively.

Other objects and advantages of the invention will be evident from the following description.

The objects of this invention are attained in a process wherein a polymethylbenzene compound in the liquid phase and chlorine are fed in countercurrent through a plurality of discrete reaction zones in series while being maintained at a reaction temperature and exposed to actinic light.

The drawing is a flow-sheet of the process and a diagrammatic representation of a suitable way for practicing the invention.

In the present method, a polymethylbenzene compound is converted to a perchlorinated compound by reaction with a nearly theoretical proportion of chlorine, without the inconvenient recovery of an excess of unused chlorine and without appreciable formation of by-products and tars.

As is evident from the drawing, the present invention comprises the features of a countercurrent, multi-stage chlorination process, in which the operations can be carried on in continuous member. It is necessary to employ a plurality of distinct, discrete reaction zones, of which there should be at least three and preferably five, as shown in the drawing, or more. No particular limitation need be placed on the kind of apparatus used to provide these reaction zones, except that provision be made for (1)

admitting a liquid feed and a gaseous feed to each zone, (2) contacting the liquid and gas phases in each zone, (3) passing a portion of the liquid phase and a portion of the gaseous phase out of each zone in opposite directions to the next successive reaction zones, respectively, (4) preventing each phase in each zone from returning to the zone from whence it came, (5) maintaining a desired temperature in each reaction zone, and (6) irradiating the liquid phase in each reaction zone with actinic light. These conditions are easily atatined by means of a series of separate vessels inter-connected to permit liquid flow in one direction and gas flow in opposite direction, from one vessel to the next in the series. Usually, a series of reactors is assembled in a cascade arrangement, with the starting liquid material being fed into the uppermost reactor and flowing downward, e. g. by gravity, to and through the successive lower reactors to the lowest reactor. Countercurrently, a gas stream is caused to flow upward from the lowest to the highest reactor, usually under pressure of chlorine fed to the lowest reactor. The plurality of reaction zones can be provided within a single structure which is subdivided into chambers with the necessary conduits for liquid and gas flow. For example, a device similar to a bubble-cap distillation column can be employed.

It is not necessary that all of the reactors in a series for practice of this invention be of the same size nor that the same amount of the reactants be in each of these reaction zones. It is sometimes preferred that certain of the reactors be large and others small relative to each other in the apparatus.

From the reaction zone to which the polymethylbenzene compound is initially fed, to the last zone from which the poly(perchloromethyl)benzene compound product is withdrawn, there is a progressively increasing degree of chlorination of the material in the liquid phase. Ordinarily there is also a progressively increasing difficulty of further chlorination of that material in the liquid phase. It is an important feature of the present invention that the concentration of chlorine in the gas phase also progressively increases from one reaction zone to another as the degree of chlorination of the material in the liquid phase increases. Conversely, the initial starting material is chlorinated with a chlorine-containing gas which is diluted with hydrogen chloride. Among the important consequences of this process are these:

(1) The initial starting material is chlorinated with a dilute chlorine which, while active enough to chlorinate the more reactive positions on the polymethylbenzene compounds, is not so active that unwanted by-products and decomposition reactions are caused to occur.

(2) The last stages of chlorination to a highly chlorinated end-product are effected by a concentrated chlorine which is sufficiently reactive to drive the reaction quickly to completion and is not handicapped by dilution with an appreciable proportion of hydrogen chloride.

(3) Overall, only a theoretical proportion of chlorine is required.

(4) In the continuous process, the operation in each reaction zone can be maintained at substantially constant and optimum conditions, and excellent control of the process can be readily obtained.

(5) A high production rate can be maintained with a minimum of inventory of materials in process and a relatively short reaction time, thereby further minimizing by-product formation, increasing the quality of the product and reducing the hazards of the operation.

The economical consumption of chlorine is of considerable importance since it has not hitherfore been thought possible to prepare a poly(perchloromethyl)benzene compound, such as pentachloro-o-xylene, unless a large excess, e. g. a 3- to 5-fold excess, of chlorine were employed.

Usually, in practice of this invention, a polymethylbenzene compound in liquid form is fed continuously into one of the end reaction zones and chlorine gas is fed into the other end zone of a series of reaction zones as herein described. The relative rates of feed of the polymethylbenzene compound and of chlorine correspond closely to those theoretically required for production of the corresponding poly(perchloromethyl)benzene compound. For example, in the preparation of pentachloro-o-xylene, approximately five moles of chlorine are fed per mole of o-xylene; in the preparation of hexachloro-p-xylene, approximately six moles of chlorine are fed per mole of p-xylene. The liquid phase is caused to move through the series of zones toward the chlorine inlet end while the gas phase is caused to flow oppositely toward the organic feed inlet end of the series of zones. The liquid phase is irradiated with actinic light, preferably radiations rich in the violet and ultra-violet region of the spectrum. It is important that the radiation be confined principally to the liquid phase in order to cause the reaction to occur in the liquid phase and not in the vapor phase.

During passage through the respective reaction zones, the liquid and gas phases are thoroughly contacted. Usually, bubbling the gas through the liquid by means of a gas sparger provides sufficient mixing, but mechanical stirrers, baffles or packing materials can be employed. The reaction zones can contain such heating or cooling devices as are necessary to maintain the reaction mixture at a chosen temperature, or these devices can be employed on the liquid conduits between reaction zones. Usually, in the zones where the first chlorination of the polymethylbenzene compound occurs, cooling is required to remove heat of reaction. In the latter zones, where the perchlorination is completed, it is usually necessary to supply heat to maintain the liquid at reaction temperatures.

The most desirable reaction temperature to be maintained in the reaction zones depends on the particular material being chlorinated and product being made, and is usually between about 90° and about 160° C. In the case of the preparation of pentachloro-o-xylene from o-xylene, the preferred reaction temperature range is from about 90° to about 115° C. in order to avoid the occurrence of chlorinolysis, i. e., the cleavage of side chain carbon groups from the benzene nucleus which sometimes occurs with o-xylene derivatives at higher temperatures. In some instances, it is desirable to maintain certain of the discrete reaction zones at temperatures different from those of others, e. g. higher temperatures in zones of higher chlorine content.

The process is usually carried out at atmospheric pressure, although pressures above or below atmospheric pressure can be used.

The liquid effluent from the last zone, i. e., the zone of entry of chlorine into the process, usually contains some dissolved chlorine which can be removed by usual means, e. g. by blowing with an inert gas such as air, nitrogen, carbon dioxide or the like in a conventional scrubber as shown in the drawing. Alternatively, chlorine and acid impurities can be removed from the poly-(perchloromethyl)benzene product by chemical means or by washing with water. There is thereby obtained a perchlorinated polymethylbenzene compound product substantially free of unreacted chlorine. The scrubbing gas, if one be used, can be fed to one of the early reaction zones, e. g., the zone into which the organic starting material is fed, to utilize the chlorine purged from the perchlorinated product.

The vapor effluent from the first reaction zone is substantially free of chlorine. After cooling, whereby most of the organic vapors are condensed and returned to the reaction system, the gas is preferably scrubbed with water in a conventional scrubber, whereby the hydrogen chloride is dissolved, forming hydrochloric acid, and the remaining organic vapors are condensed. The vent gases from the hydrochloric acid scrubber consist largely of the inert gas from the perchlorinated product scrubber. From the hydrochloric acid scrubber, the organic material can be separated, dried and recovered for return to the process. The hydrochloric acid can be utilized elsewhere or discarded. The hydrogen chloride can be converted to chlorine, e. g. by oxidation, and the chlorine returned to the process.

The present method is particularly advantageous for the perchlorination of di- and tri-methylbenzene compounds and especially of o-xylene, m-xylene, p-xylene, mesitylene, pseudocumene and nuclear chlorinated derivatives thereof, and mixtures of such compounds. Specific examples of perchlorinated derivatives which can be produced by this method, and suitable starting materials, are as follows:

$\alpha,\alpha,\alpha',\alpha'$-Pentachloro-o-xylene from o-xylene;
$\alpha,\alpha,\alpha,\alpha',\alpha',\alpha'$-Hexachloro-m-xylene from m-xylene;
$\alpha,\alpha,\alpha,\alpha',\alpha',\alpha'$-Hexachloro-p-xylene from p-xylene;
Aliphatic-nonachloromesitylene from mesitylene;
Aliphatic - octachloropseudocumene from pseudocumene;
$\alpha,\alpha,\alpha,\alpha',\alpha'$,4-Hexachloro-o-xylene from 4-chloro-o-xylene; and $\alpha,\alpha,\alpha,\alpha',\alpha',\alpha'$,2 - heptachloro - p - xylene from 2-chloro-p-xylene.

Mixtures of polymethylbenzene compounds can also be used as starting materials, and commercial compositions, containing isomeric and homologous compounds and impurities normally associated with their origin, are generally suitable. For example, commercial xylene, being a mixture of isomeric xylenes and usually containing ethylbenzene, toluene, some trimethylbenzenes, ethyltoluene and aliphatic hydrocarbons boiling in the xylene boiling range, can be employed in this process to obtain mixtures of poly(perchloromethyl)benzenes.

Materials already partially chlorinated in the methyl groups can be used as starting materials when these are available. Often it is advantageous to prepare a partially chlorinated material by a preliminary batch reaction step thereby furnishing a more desirable feed material for the continuous process of this invention. For example, a xylene, or mixtures of xylenes, can be chlorinated efficiently with up to about two molecular proportions of chlorine, e. g., to form a dichloroxylene product, in an ordinary batch process in the well-known manner. The resulting partially chlorinated material, comprising $\alpha$-chloroxylenes, $\alpha,\alpha'$-dichloroxylenes and the like, is suitable for use as starting material in the present continuous process. Such a material is especially advantageous as a starting material because, due to its lower vapor pressure as compared to the corresponding hydrocarbons, a lesser amount of organic material is swept out of the first reactor with the hydrogen chloride gas stream. Furthermore, the volume of that hydrogen chloride gas stream is itself lessened because of the lesser amount of chlorination required by the already partially chlorinated feed material.

Usually, the starting material, in a liquid form, is used without added solvent, but usual chlorination solvents can be used and are preferably used when the starting material is otherwise difficult to liquefy.

The following examples illustrate ways in which the invention has been practiced, but should not be construed as limiting its scope.

EXEMPLARY APPARATUS AND MODE OF OPERATION

A multi-stage, countercurrent, continuous chlorination apparatus, of which the drawing is a diagrammatic representation, was assembled as follows:

A group of five 2-liter glass reaction flasks was arranged and interconnected in step-down or series cascade fashion, one being at a highest elevation, the next at a lower level, the next at a still lower level and so on to the last at a lowest level. For convenience, the reactor at highest level is herein referred to as the first reactor and the numbering is continued consecutively to the reactor at lowest level as the fifth or last reactor. From each reactor, except the last, a conduit was provided for passing liquid to the next lower reactor, each reactor being maintained about half-full of liquid during operation of the process. From each reactor, except the first, a conduit was provided for passing gas to, and beneath the liquid in, the next higher reactor. To the first reactor, a liquid polymethylbenzene starting material was fed from a storage vessel through flow control valves. From the first reactor, the gases were passed upward, through a reflux condenser, hence to the bottom of a scrubber consisting of a packed column down which flowed a stream of water. Top gases from the scrubber were vented to waste. The bottom liquid effluent from the scrubber was cooled and separated in a mechanical separator, whereby a hydrochloric acid product and a recovered organic material were obtained.

To the last reactor, chlorine gas was bubbled beneath the liquid charge. The chlorine gas was obtained from a storage cylinder and passed through the usual train of traps, scrubbers, safety relief device and flow meter. From the last reactor, the liquid product passed to the top of a scrubber column and flowed downward against a stream of nitrogen gas passed into the bottom of the scrubber. The top vapors from this scrubber contained chlorine gas and were passed to the first reactor and bubbled beneath the liquid therein. The liquid product from the nitrogen scrubber was taken as the poly(perchloromethyl)benzene product.

Each reactor contained a thermocouple for determination of temperature therein and provision was made for heating or cooling the contents of each reactor to maintain those contents within a desired reaction temperature range. Through the glass bottom of each reactor, the liquid therein was illuminated by light from a type RS, 275-watt sun lamp, which produced an appreciable amount of radiation in the region below 4800 Angstrom units.

*Example 1*

This example illustrates the preparation of pentachloro-o-xylene from o-xylene.

To the first reactor of the apparatus just described was fed o-xylene at an average rate of 135 grams per hour while chlorine was fed into the last reactor at an average rate of 1 pound (453.6 grams) per hour. The temperature of the first reactor was maintained at 80°–90° C. while the temperatures in the other reactors 2–5 were maintained at about 115° C. After the process had been operated for a time long enough to attain a steady state, a sample of liquid reaction mixture was taken from each reactor and analyzed. Table I shows the composition, in percent by weight, of the organic material in each reactor zone under the conditions just described.

TABLE I

| Reactor No. | 1 | 2 | 3 | 4 | 5 |
|---|---|---|---|---|---|
| o-Xylene | 35 | | | | |
| Monochloro-o-xylene | 65 | | | | |
| Dichloro-o-xylene | | 45 | | | |
| Trichloro-o-xylene | | 25 | | | |
| Tetrachloro-o-xylene | | 20 | 29 | 6 | |
| Pentachloro-o-xylene | | 10 | 71 | 94 | 100 |

Both the hydrogen chloride gas from the first reactor and the pentachloro-o-xylene product from the nitrogen scrubber were substantially free of unreacted chlorine.

*Example 2*

This example illustrates the preparation of hexachloro-p-xylene from p-xylene.

In an apparatus, and by a procedure, similar to that hereinbefore described, p-xylene was fed at an average rate of about 147 grams per hour to the first reactor while chlorine was being fed to the last reactor at an average rate of about 1.25 pounds (567 grams) per hour.

The temperatures in the several reactors were maintained approximately as follows:

| Reactor No. | Temperature Range, ° C. |
|---|---|
| 1 | 110–115 |
| 2 | 150–155 |
| 3 | 145–155 |
| 4 | 140–150 |
| 5 | 140–150 |

After two days of operation, the liquid in each reactor was sampled and analyzed as follows:

| Reactor No. | Hexachloro-p-xylene, percent by Weight |
|---|---|
| 1 | nil. |
| 2 | less than 5. |
| 3 | 80. |
| 4 | 100. |
| 5 | 100. |

During the next 43 hours of operation, 5820 grams of p-xylene and 22,930 grams of chlorine were used under the conditions hereinbefore described. During this portion of the test, about 279 grams of p-xylene was recovered from the hydrochloric acid separator while 15,485 grams of hexachloro-p-xylene was collected from the nitrogen scrubber. Based on the p-xylene consumed, the recovery of hexachloro-p-xylene is 94.7 percent of theory and is 92 percent of theoretical based on chlorine used. Ninety-two percent of the chlorine was also accounted for as hydrochloric acid from the gas scrubber.

At the conclusion of the test, the liquid in the reactors was again sampled and analyzed as follows:

| Reactor No. | Hexachloro-p-xylene, Percent by Weight |
|---|---|
| 1 | not tested. |
| 2 | 20. |
| 3 | 72. |
| 4 | 95. |
| 5 | 100. |

The hexachloro-p-xylene product from the nitrogen scrubber was nearly colorless material and readily crystallized to a solid mass having a melting point of 107–109° C.

In contrast to the results just described for the continuous perchlorination of p-xylene by the method of this invention, p-xylene was chlorinated by a batch procedure. To 7 grams-moles of p-xylene at a temperature of 60° C. was added chlorine gas. The temperature of the mixture rose spontaneously and was allowed to increase to 130°–140° C. whereupon cooling was applied and the temperature thereafter was held between 140° and 150° C. while a total of 56 gram-moles of chlorine (14 gram-moles more than theoretically required) was bubbled into the liquid mixture over a period of 21.5 hours. During the last portion of the chlorination, an increasing proportion of chlorine passed through the reaction mixture without being reacted and was lost by venting with the hydrogen chloride. The crude chlorinated p-xylene product melted at a temperature of 87°–105° C., corresponding to a composition of approximately 80–85% hexachloro-p-xylene by weight. Thus, the batch chlorination was obviously not complete, in spite of the excess of chlorine which had been employed. Furthermore, the product was colored a dark brown with tarry by-products of side reactions.

In place of the o-xylene and p-xylene used as starting materials in the foregoing examples, there can be substituted another polymethylbenzene compound or mixtures thereof, such as commercial xylene which is a mixture of isomeric xylenes and other close-boiling hydrocarbons. Also, nuclear chloropolymethylbenzene compounds and materials already partially chlorinated in the carbon side chains, such as α-chloroxylene and α,α'-dichloroxylene, can be employed with substantially similar results.

*Example 3*

This example illustrates the perchlorination of a commercial mixture of xylenes having the following analysis by weight.

| | Percent |
|---|---|
| o-Xylene | 1 |
| m-Xylene | 60 |
| p-Xylene | 22 |
| Toluene | 2 |
| Ethylbenzene | 15 |

The commercial xylene mixture had been distilled to remove water and traces of iron.

The xylene mixture was fed at rates of from 200 to 210 mls. per hour to the first vessel of the continuous chlorination apparatus hereinbefore described, in countercurrent to chlorine fed into the vast vessel of the series at an average rate of 1.5 pounds per hour. Temperatures in the several vessels were maintained in the following ranges during three days' duration of the run:

No. 1 at 90–100° C.
No. 2 at 120–130° C.
Nos. 3–5 at 140–150° C.

Chlorine-free hydrogen chloride, in amount corresponding to 99 percent of theory, was taken from the first vessel. The perchlorinated xylene product from the last vessel was passed through the nitrogen scrubber and emerged substantially free of unreacted chlorine and in amount corresponding to about 99 percent of theory. The perchlorinated product had the following analysis by weight:

| | Percent |
|---|---|
| Pentachloro-o-xylene | 1 |
| Hexachloro-m-xylene | 44 |
| Heptachloro-m-xylene (note) | 15 |
| Hexachloro-p-xylene | 22 |
| Benzotrichloride | 2 |
| Pentachloroethylbenzene | 14 |

NOTE.—The formation of some heptachloro-m-xylene is probably the consequence of nuclear chlorination of m-xylene which occurs very readily, even in the absence of added catalysts.

*Example 4*

This example illustrates the preparation of aliphatic-octachloropseudocumene.

In an apparatus, and by a procedure, similar to that hereinbefore described, pseudocumene was fed to the first reactor at an average rate of about 120 ccs. per hour while feeding one pound (453.6 grams) of chlorine per hour to the last reactor. The temperatures in the five reactor vessels were maintained progressively higher from 60°–80° C. in the first vessel to 140°–150° C. in the last vessel. The chlorinated pseudocumene product was passed through the nitrogen scrubber and emerged substantially free of unreacted chlorine. The vent gas from the first reactor was also substantially free of unreacted chlorine.

Analysis of the perchlorinated pseudocumene product showed 70.6 percent by weight chlorine, corresponding to an average of about eight chlorine atoms per molecule. The product was a mixture, probably consisting predominately of $\alpha',\alpha',\alpha',\alpha^2,\alpha^2,\alpha^4,\alpha^4,\alpha^4$-octachloropseudocumene and $\alpha',\alpha',\alpha^2,\alpha^2,\alpha^2,\alpha^4,\alpha^4,\alpha^4$ - octachloropseudocumene.

*Example 5*

This example illustrates the perchlorination of p-xylene on a semi-commercial scale.

A continuous chlorination plant was constructed on the same principles as were embodied in the laboratory apparatus hereinbefore described. Five chlorination reactors were arrayed in series on five different levels and numbered 1–5 from top downward. Each reactor was essentially a cylinder 15 inches in diameter by 18 inches in length having its major axis horizontal. The reactors were interconnected with conduits for flow of liquid out of each reactor from a point near the top of the reactor down to the next lower reactor, except that the liquid from the lowest reactor (Number 5) flowed to a gas scrubber. In operation, each reactor contained about 11 gallons of liquid. Conduits were also provided at the top of each reactor for flow of gas from each reactor upward into the next higher reactor, except that the gas from the top (Number 1) reactor passed through a reflux condenser to a water scrubber for absorption of hydrogen chloride. The gas conduits led to perforated pipe gas spargers near the bottom of the vessels. Chlorine gas was fed to the lowest (Number 5) reactor through the usual gas train devices.

Each reactor was equipped with a Pyrex glass well in which was a 1200 watt, type UA11 photochemical lamp emitting about 22 percent of its energy in the form of light having wavelengths in the range from about 2200 to about 5400 Angstrom units, the entire well being below the liquid level in the reactor during operation.

The reactors were also equipped with internal pipe coils for heating or cooling the contents of the reactors by indirect contact with fluid heat transfer media such as steam or water. All of the conduits for gas or liquid reaction materials were jacketed for passage of heat transfer media. The apparatus was also equipped with the usual appurtenances such as valves, pressure gauges, safety devices, flow-meters, temperature recorders, and the like for the control of the operation.

In operation of this plant for the preparation of $\alpha,\alpha,\alpha,\alpha',\alpha',\alpha'$ - hexachloro - p - xylene, liquid p - xylene, (97 percent by weight assay, the balance being ortho- and meta-xylene and toluene) was fed into the first chlorinator, i. e., the top-most reactor, at an average rate of 11.2 pounds per hour.

Chlorine gas was fed into the last chlorinator, i. e., the bottom-most reactor, at an average of about 42 pounds per hour.

The temperature in the reflux condenser was held at 20–25 C. and temperatures in the chlorinators were held in the following ranges:

Number 1 _____ ° C__ 75–80
Numbers 2–5 _____ ° C__ 130–140

The hydrogen chloride vent gas was substantially free of unreacted chlorine, but contained some xylene vaporized and swept out of the first chlorinator. This xylene was recovered but was not returned directly to the process. Instead, the rate of feed of fresh p-xylene was made to compensate for the proportion of xylene removed from the system by the exit gas stream, the net proportion of p-xylene retained by the system being approximately one mole per six moles of chlorine fed.

The perchlorinated product from the last chlorinator was passed through a nitrogen gas scrubber, the vent gas from the scrubber being admixed with the gas stream flowing into the second chlorinator. The hexachloro-p-xylene product emerged from the nitrogen scrubber at an average rate of about 31 pounds per hour, substantially free of unreacted chlorine.

We claim:
1. A process for making poly(perchloromethyl)benzene compounds which comprises passing, in intimate contact and in countercurrent through a plurality of discrete reaction zones in series, a gas stream comprising chlorine and a liquid stream comprising at least one aromatic compound of the benzene series wherein from two to three carbon atoms of the aromatic nucleus are attached to radicals selected from the group consisting of methyl and chloromethyl radicals and the remaining carbon atoms of the aromatic nucleus are attached to atoms selected from the group consisting of hydrogen and chlorine atoms, establishing in each such discrete reaction zone a liquid phase consisting substantially of the constituents of the liquid stream and containing constituents of the gas stream dispersed therein and a gas phase consisting substantially of the constituents of the gas stream together with any constituents vaporized from the liquid stream, maintaining the liquid phase in each reaction zone at a temperature conducive to chlorination of the aromatic compound, and irradiating the liquid phase in each discrete reaction zone with actinic radiation in a manner such as to confine the radiation substantially to the liquid phase while preventing appreciable irradiating of the gas phase in such zone.

2. A process for making poly(perchloromethyl)benzene compounds, which process comprises feeding a gas to one end, and a liquid to the other end, of a series of at least three discrete and interconnected reaction zones, the gas comprising chlorine and the liquid comprising at least one aromatic compound of the benzene series wherein from two to three carbon atoms of the aromatic nucleus are attached to carbon side chains selected from the group consisting of methyl and chloromethyl radicals and the remaining carbon atoms of the aromatic nucleus are attached to atoms selected from the group consisting of hydrogen and chlorine atoms, the gas and liquid being fed at rates such that the chlorine in the chlorine-containing gas corresponds approximately to the proportion of chlorine required to perchlorinate the carbon side chains of the aromatic compound in the liquid, thereby forming a gas stream comprising chlorine and a liquid stream comprising the aromatic compound, passing the gas stream and the liquid stream in intimate contact and countercurrent flow through the series of discrete reaction zones, establishing in each discrete reaction zone a liquid phase consisting substantially of the constituents of the liquid stream and containing constituents of the gas stream dispersed therein and a gas phase consisting substantially of the constituents of the gas stream together with any constituents vaporized from the liquid stream, maintaining the liquid phase in each reaction zone at a temperature conducive to chlorination of the aromatic compound, and irradiating the liquid phase in each discrete reaction zone with actinic radiation in a manner such as to confine the radiations substantially to the liquid phase while preventing appreciable irradiating of the gas phase in such zone.

3. A process according to claim 2 wherein the chlorination reaction temperature is in the range from 90° to 160° C., said range being from 90° to 115° C. when the aromatic compound is an o-xylene compound.

4. A process for making bis-(perchloromethyl)-benzenes according to claim 3 wherein the aromatic compound of the benzene series is at least one xylene.

5. A continuous process for making bis-(perchloromethyl)-benzenes from aromatic compounds of the benzene series wherein two carbon atoms of the aromatic nucleus are attached to carbon side chains selected from the group consisting of methyl and chloromethyl radicals and the remaining carbon atoms of the aromatic nucleus are attached to hydrogen atoms, which process comprises feeding at least one such aromatic compound in a liquid form into the first reaction vessel of a series of at least three interconnected reaction vessels and feeding chlorine gas into the last reaction vessel of such series, the relative rates of feeding chlorine and the aromatic compound being such as to correspond approximately to the proportion of chlorine necessary to perchlorinate the carbon side chains of the aromatic compound, forming in each reaction vessel a reaction mixture comprising liquid constituents and gas constituents, establishing in each reaction vessel a liquid phase consisting substantially of the liquid constituents and containing a portion of the gas constituents dispersed therein and a gas phase consisting substantially of the gas constituents together with any vaporized liquid constituents, feeding the starting chlorine gas into intimate contact with the liquid phase in the last reaction vessel of the series, passing a portion of the gas phase from each reaction vessel except the first vessel into intimate contact with the liquid phase in the next preceding vessel of the series, passing a portion of the liquid phase from each reaction vessel except the last vessel into the next succeeding vessel of the series, maintaining the liquid phase in each reaction vessel at a temperature in the range from 90° to 160° C., said range being from 90° to 115° C. when the starting aromatic compound is an o-xylene compound, irradiating the liquid phase in each reaction vessel with actinic radiation in a manner such as to confine the radiation substantially to the liquid phase while preventing appreciable irradiating of the gas phase in such reaction vessel, withdrawing a portion of the liquid phase from the last reaction vessel in the series and venting a portion of the gas phase from the first reaction vessel of the series.

6. A process according to claim 5 wherein the portion of liquid phase withdrawn from the last reaction vessel is contacted with a stream of inert gas until the liquid is substantially free of unreacted chlorine, the gas stream thereby resulting being passed into one of the reaction vessels except the last reaction vessel.

7. A continuous process for making $\alpha,\alpha,\alpha,\alpha',\alpha'$-pentachloro-o-xylene according to claim 5, wherein the aromatic compound is o-xylene.

8. A continuous process for making $\alpha,\alpha,\alpha,\alpha',\alpha',\alpha'$-hexachloro-p-xylene according to claim 5, wherein the aromatic compound is p-xylene.

References Cited in the file of this patent

UNITED STATES PATENTS

| | | |
|---|---|---|
| 1,828,858 | Conklin | Oct. 27, 1931 |
| 2,132,361 | Osswald et al. | Oct. 4, 1938 |
| 2,608,660 | Noebels | Aug. 26, 1952 |
| 2,695,873 | Loverde | Nov. 30, 1954 |